Patented Nov. 13, 1934

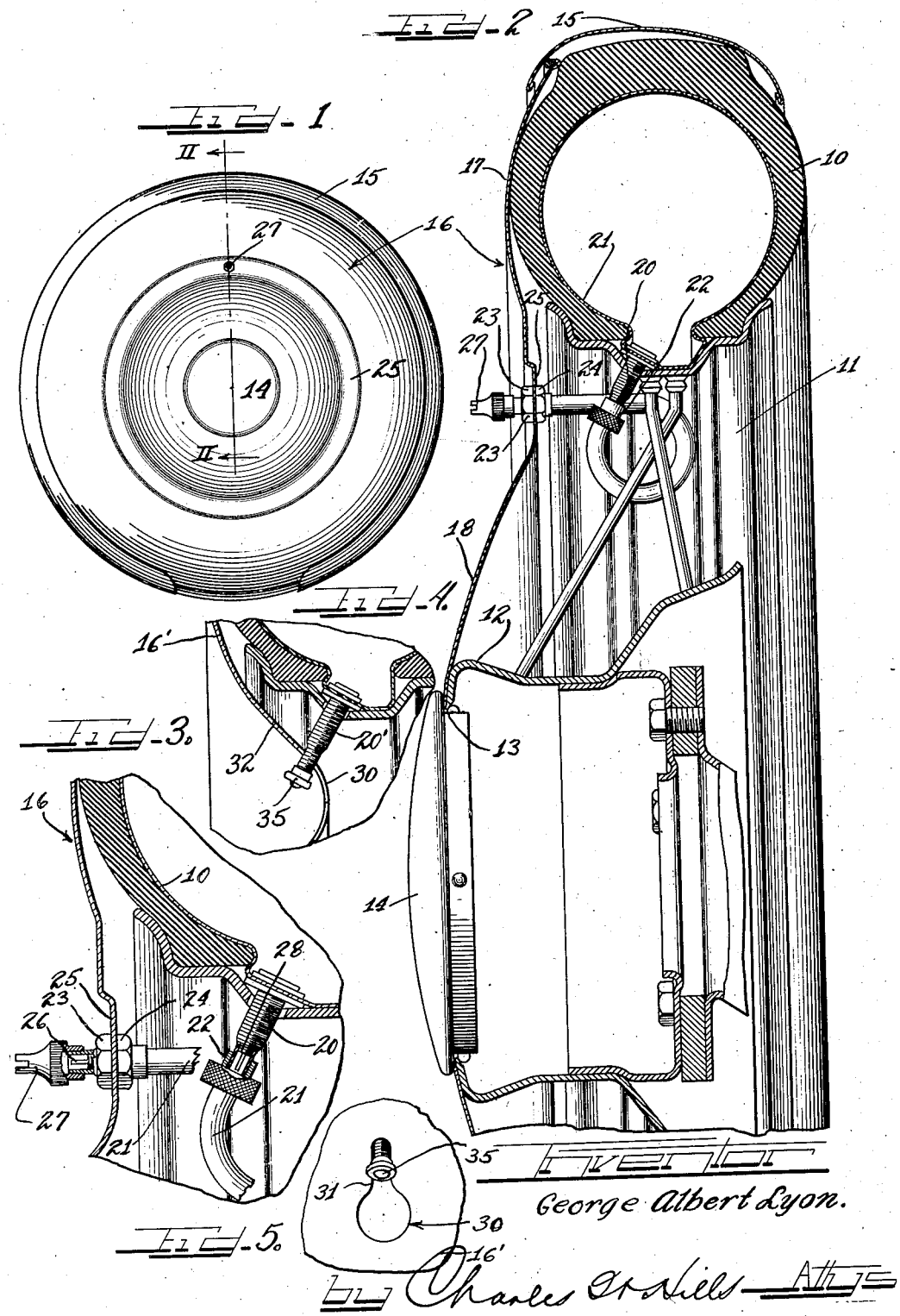

1,980,690

UNITED STATES PATENT OFFICE 1,980,690

SPARE TIRE COVER CONSTRUCTION

George Albert Lyon, Detroit, Mich., assignor to Lyon Incorporated, Detroit, Mich., a corporation of Delaware Application August 21, 1933, Serial No. 686,085

3 Claims. (Cl. 150—54)

This invention relates to spare tire covers and more particularly to a spare tire cover construction in which means is provided for pulling an outer side portion of the cover toward the tire and for anchoring said portion to the valve stem of the spare tire.

An object of this invention is to provide a simplified structure for pulling the side portion or member of a spare tire cover into proper cooperation with the tire and for securing it in place.

Another object of the invention is to provide means whereby the valve stem of the spare tire may be utilized as a medium for aiding in holding the cover in proper tire protecting position on a spare tire.

In accordance with the general features of this invention, there is provided a spare tire cover construction including a side portion or disc for disposition over an outer side of a spare tire and having an opening provided with means which permits of the securing of the side portion to the valve stem of the spare tire.

In accordance with other features of this invention, there is provided a modified structure in which the opening is in the form of a bayonet slot into the smallest portion of which the valve is movable to secure the side portion of the spare tire cover to the valve stem.

Other objects and features of this invention will more fully appear from the following detail description taken in connection with the accompanying drawing which illustrates several embodiments thereof, and in which—

Figure 1 is a side view of a spare tire cover construction embodying the features of this invention.

Figure 2 is an enlarged fragmentary cross sectional view taken on substantially the line II—II of Figure 1 looking in the direction indicated by the arrows and showing the manner in which the side portion of the cover is anchored to the valve stem.

Figure 3 is an enlarged view of a portion of Fig. 2 showing more in detail how the valve stem and an extension thereon is utilized to pull the side portion of the cover into proper tire protecting position on the outer side wall of the spare tire.

Figure 4 is a fragmentary sectional view similar to Figure 3 showing a modification of the invention and in which the side portion of the spare tire cover is secured directly to the valve stem rather than to an extension on the valve stem.

Figure 5 is a fragmentary view of a portion of the side disc of the cover shown in Figure 4 and illustrating the bayonet slot or opening in the side disc for cooperation with the valve stem.

The reference character 10 designates generally a spare tire mounted on a conventional spare wheel 11 including a central hub 12. The wheel hub 12 has the usual opening 13 for accommodating a hub cap 14 which may be of any suitable construction.

The spare tire cover illustrated in the drawing, is of the so-called two-part Lyon type, such as disclosed in my Patent No. 1,807,697 dated June 2nd, 1931. It is of course to be understood, however, that my present invention is not limited to that specific type of cover but may be used with equal advantage in connection with covers of other constructions.

The tire cover as shown embodies a split tread covering part 15 which is expansible and contractible for application to and removal from the spare tire. This tread covering part 15 overlaps and cooperates with a side disc or portion 16 disposed over the outer side wall of the spare tire. The side disc 16 includes an annular portion 17 of curved and convex construction so as to conform with the outer side wall of the spare tire 10. Inwardly of this annular portion 17 the disc 16 is provided with a centrally bulged portion 18 having a central opening of substantially the same size as the opening 13 in the wheel hub 12 so that the hub cap 14 may be inserted into the wheel hub. It will be noted from Figure 2 that the hub cap is adapted to overlie the inner peripheral edge of the disc 16 so as to clamp this disc to the wheel hub 12.

In order to aid in maintaining the side disc 16 in proper tire protecting position on the tire 10, I have conceived of the idea of using the valve stem 20 of the spare tire as a means to which the side disc may be fastened. In the form of the invention shown in Figures 1, 2 and 3, the valve stem 20 is provided with an extension 21 one end of which is threaded at 22 over the free end of the valve stem as best shown in Fig. 3. The other end of the tubular extension is secured by means of lock nuts 23 and 24 to a flattened portion 25 of the side disc 16. The nut 23 is disposed on one side of the side disc and the nut 24 is disposed on the opposite side. The outermost extremity of this extension 21 has disposed in it the usual air valve designated generally by reference character 26. Also, there is threaded over the outermost extremity of the extension 21 the usual valve cap 27.

It will be noted that the valve stem 20 also has a conventional air valve 28 disposed therein as best shown in Figure 3. Of course it follows that when air is introduced into the valve stem extension 21, the air under pressure not only opens the valve 26 but also opens the valve 28 so as to enter the inner tube within the tire.

By tightening the nut 23 on the extension 21, it is possible to draw the side disc 16 up tight against the outer side of the spare tire 10. When it is desired to remove the cover from the tire, the valve cap 27 is first removed from the extension 21 and then the nut 23 is unthreaded from the extension. Thereafter the side disc 16 may be pulled laterally off of the valve stem extension 21.

In the form of the invention which I have just described, the opening in the side disc 16 for accommodating the valve stem extension 21 is preferably circular and of a diameter slightly larger than that of the valve stem extension. On the other hand, in the modified form of the invention shown in Figs. 4 and 5, the opening is in the form of a bayonet slot 30 which includes an upwardly extending narrow slot portion designated by the reference character 31.

The side disc 16' in which this bayonet slot 30 is disposed is not formed with a flattened area such as the ring-like area 25 of the previously described disc 16 but instead is curved inwardly as indicated at 32. The valve stem 20' is adapted to extend through the bayonet slot 30 and has on its outermost end a valve cap 35.

The narrow part 31 of the bayonet slot 30 is of a width less than the diameter of the valve cap 35 so that if the valve stem is passed through the lower end of the slot 30 and thereafter raised upwardly, it is interlocked with the side disc 16'. In other words, the side disc 16' cannot thereafter be removed without either its being raised off of the valve stem or the valve stem being moved downwardly to bring it into the enlarged lower end of the bayonet slot 30 whereby the cap 35 may pass through the slot.

In the application of the side disc 16 to the cover, the side disc is first brought into such a position that the cap end of the valve stem 20' is permitted to pass through the lower end of the bayonet slot 30. Thereafter the disc 16 is pushed downwardly whereby the valve stem is caused to move up into the narrow neck 31 of the bayonet slot.

I am aware that changes may be made and numerous details of construction may be varied through a wide range without departing from the principles of this invention, and I, therefore, do not purpose limiting the patent granted hereon otherwise than is necessitated by the prior art.

I claim as my invention:

1. In a spare wheel and cover construction, a tire including a relatively rigid valve stem, a side portion for disposition over a side of a wheel and having a valve stem opening therein and means associated with said side portion for securing said portion to the valve stem of the spare tire.

2. In a spare tire and cover construction including a side disc for disposition over an outer side wall of a spare tire, means for pulling said disc toward the tire including the valve stem of the spare tire.

3. In a spare tire and cover construction including a side disc for disposition over an outer side wall of a spare tire, means for pulling said disc toward the tire including the valve stem of the spare tire, and a tubular extension on the stem projecting through an opening in said disc, said disc being detachably fastened to said extension.

GEORGE ALBERT LYON.